(12) United States Patent
Hoogzaad

(10) Patent No.: US 7,514,894 B2
(45) Date of Patent: Apr. 7, 2009

(54) DRIVER FOR A BRUSHLESS MOTOR AND DATA READING/WRITING DEVICE COMPRISING A BRUSHLESS MOTOR CONTROLLED BY SUCH A DRIVER

(75) Inventor: Gian Hoogzaad, Mook (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 11/997,253

(22) PCT Filed: Aug. 2, 2006

(86) PCT No.: PCT/IB2006/052643
§ 371 (c)(1),
(2), (4) Date: Jan. 29, 2008

(87) PCT Pub. No.: WO2007/017802
PCT Pub. Date: Feb. 15, 2007

(65) Prior Publication Data
US 2008/0224641 A1 Sep. 18, 2008

(30) Foreign Application Priority Data
Aug. 9, 2005 (EP) .................................. 05107315

(51) Int. Cl.
G05B 11/28 (2006.01)
(52) U.S. Cl. .................... 318/599; 318/811; 318/400.01
(58) Field of Classification Search ................. 318/459, 318/500, 599, 811, 400.01, 400.34, 400.35
See application file for complete search history.

(56) References Cited
U.S. PATENT DOCUMENTS

| 5,640,073 A | 6/1997 | Ikeda et al. |
|---|---|---|
| 5,652,525 A * | 7/1997 | Mullin et al. ............... 324/772 |
| 5,672,948 A | 9/1997 | Cohen et al. |
| 5,739,651 A | 4/1998 | Miyazawa et al. |
| 6,204,617 B1 | 3/2001 | Van Hout et al. |
| 6,541,939 B2 * | 4/2003 | Kishibe et al. .............. 318/799 |
| 6,922,027 B2 * | 7/2005 | Schwarz et al. ........ 318/400.01 |
| 2004/0032230 A1 | 2/2004 | Schwarz et al. |

* cited by examiner

*Primary Examiner*—Rina I Duda
(74) *Attorney, Agent, or Firm*—Peter Zawilski

(57) ABSTRACT

A driver for a brushless motor (10) is described comprising a static position sensing device (22), a back EMF detector for detecting a back EMF voltage (40), comprising a filter (42). The driver further comprises an output stage (30) with at least three modules ($30_U$, $30_V$, $30_W$) for supplying a current to a respective phase coil ($11_U$, $11_V$, $11_W$) of the motor (10), and a commutating device (21) for selectively enabling respective modules ($30_U$, $30_V$, $30_W$) of the output stage (30) depending on the position ($) of the motor. The selectively enabling is alternated with a commutation frequency ($V_E$). The commutating device (21) is controlled by the static position-sensing device (22) at startup of the motor and by the back EMF detector (40) after the first detected back EMF pulse. A pulse width modulation unit (29) controls a strength of the current provided to the motor at a predetermined maximum value ($I_{MAX}$) until the commutation frequency has a predetermined minimum value ($F_E$), and controls the strength of the current at a value determined by an input signal (ADC) when the commutation frequency has exceeded said minimum value. The filter (42) has a relatively strong high frequency transfer characteristic at a relatively high commutation frequency and a relatively weak high frequency transfer characteristic at a relatively low commutation frequency.

12 Claims, 11 Drawing Sheets

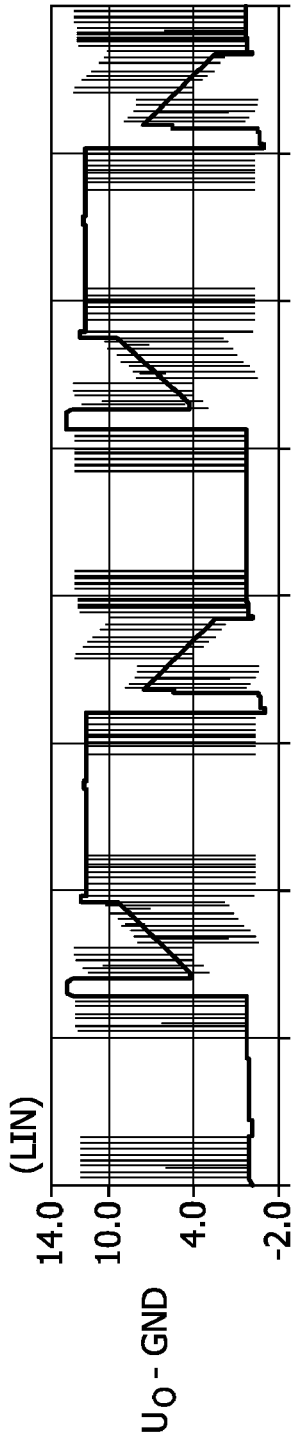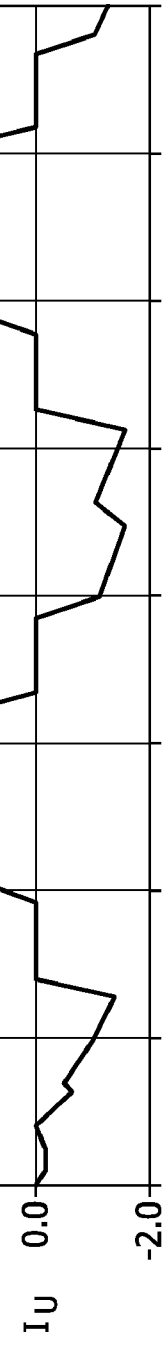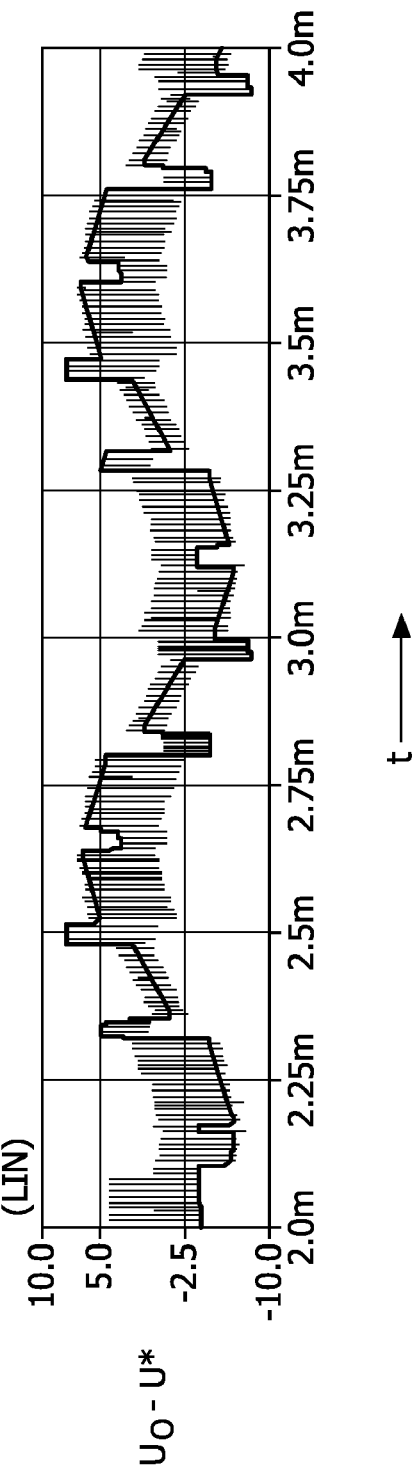
FIG. 8a
FIG. 8b
FIG. 8c

DRIVER FOR A BRUSHLESS MOTOR AND DATA READING/WRITING DEVICE COMPRISING A BRUSHLESS MOTOR CONTROLLED BY SUCH A DRIVER

DC brushless spindle motors are used on a wide scale in optical and magnetic disc drives to rotate the storage medium. Conventionally—and most practically—during normal operation back EMF voltages are used to commutate the motor. Using the back EMF signals induced in unenergized windings obviates the use of a separate sensor to sense the angular position of the rotor with respect to the stator, also denoted as 'position of the motor' or 'position. This reduces the combined system cost and size of the spindle motor. The rotational speed of the rotor, also denoted as 'speed of the motor' or 'speed' herein, can be controlled by pulse width modulation. The speed of the motor increases with the duty cycle with which the supply current of the motor is modulated. At a low speed of the motor however, the generated back EMF voltage is relatively low, and is easily overshadowed by perturbations caused by the PWM signal. Unfortunately, PWM modulation in an energized winding results in perturbations in an unenergized winding due to various causes such as a capacitive coupling between the coils, a magnetic coupling (rotor-position dependent) and resistive cross-talk of the PWM-signal in the driver.

Known motor drivers therefore have a low-speed regime in which the commutating device is controlled by a predetermined sequence of pulses which is generated independently from the back EMF signal. A problem of this synchronous startup mode is its dependence on the load: large load variations cannot be dealt with. Especially in optical disc drives load variations (inertia and friction) of more than a factor 10 are present. It is a purpose of the present invention to provide a motor driver for a brushless motor in which the commutator is controlled by the back EMF voltage from the start onwards.

It was recognized by the inventor that the commutating device can be reliably controlled by the back EMF pulses from the start onwards if the output stage provides a predetermined maximum current and the generated back EMF signal is filtered with a relatively weak high frequency transfer characteristic until the commutation frequency has obtained a predetermined minimum value. It suffices to sense the current position of the motor with a static positioning sensing method, as described in U.S. Pat. No. 6,204,617 for example, to initialize the phase of the commutator and to subsequently control the commutator using the back EMF signals. The maximum current provided to the motor at start up provides a fast acceleration and therewith a relatively high instantaneous speed at the moment that the first back EMF pulse is generated. Furthermore, at a relatively low commutation frequency, corresponding to a relatively low speed of the motor, the filter suppresses the noise in the back EMF signal caused by the pulse width modulation in the driving signal. At relatively high commutation frequency, corresponding to a relatively high speed of the motor, the filter has a relatively strong high frequency transfer characteristic and a corresponding short delay. At a high motor speed the back EMF signal is significantly strong so that the high frequency perturbations, though less well suppressed, do not hinder the detection of the back EMF signal. The characteristic of the filter may gradually change with the commutation frequency, but may otherwise show one or more stepwise changes. The minimum commutation frequency at which the supply current is allowed to be controlled by an input control signal may, but need not coincide with the commutation frequency at which a step in the filter characteristics occurs. The momentaneous speed of the motor can be determined in a conventional way with a speed sensor by counting the number of back EMF pulses in a time interval, or measuring the time interval between two subsequent back EMF pulses.

It is noted that U.S. Pat. No. 5,640,073 describes a brushless motor driver having a filter with a relatively strong high frequency transfer characteristic at a relatively high speed of the motor and a relatively weak high frequency transfer characteristic at a relatively low speed of the motor. However, the use of PWM control for controlling the speed of the motor is not disclosed. Neither is it disclosed to selectively remove PWM noise. Furthermore a startup of the motor with a maximum allowable current is not disclosed. On the contrary it is disclosed that the motor is started up and accelerated using a synchronous starting means.

It is further noted that U.S. Pat. No. 5,672,948 discloses a brushless motor driver having a back EMF detector with a fixed filter for filtering out pulse width modulation noise. The detected PWM pulses are used to determine a phase error between the current commutation phase of the driver and the position of the rotor of the motor. This document does not disclose how startup takes place. In particular it is not mentioned that the motor is started with a predetermined maximum current after the static position sensing step and that the commutation state of the commutator is determined by the back EMF signal from the start onwards.

In an example embodiment of a motor driver, the back EMF detector has a threshold unit for suppressing the back EMF signal until a threshold value until the commutation frequency has a predetermined value. The conversion of the back EMF signal involves a comparison to determine the zero crossing of this signal. In practice the exact level at which zero crossing is detected turns out to be subject to a certain tolerance. This would entail that part of the products would have to be rejected because the back EMF detector is too sensitive and detects false zero crossings. By suppressing the back EMF signal until a threshold value in the start-up phase of the motor false zero-crossings are prevented. The threshold value should be slightly higher than the worst occurring deviation from the zero-crossing level. The applied threshold voltage may be adapted either gradually with the speed of the motor or may be changed in one or more discrete steps. At a higher commutation frequency a deviation of the level at which zero crossing occurs only has minor consequences for the point in time that the zero crossing is detected. The suppression of the back EMF signal until a threshold value then becomes superfluous.

In an embodiment the driver has a hard switching operational mode wherein during each state of the commutation device one of the motor drive outputs provides a constant supply voltage, a second one of the outputs alternately provides a first and a second supply voltage and a third one is kept in a high impedance state. This has the advantage that a relatively long time interval (60°) of each commutation phase is available to sense the back EMF voltage. Furthermore this switching mode involves relatively few switching operations in the output stage, which is favorable for a low power consumption.

In a further embodiment the driver has a soft switching operational mode, which has at least a state during which two output modules simultaneously and in phase provide an output voltage alternating between the first and the second power supply voltage. In this mode the current supplied to the motor has a more 'sine' like behavior, having the advantage that the motor produces relatively few audible noise. The relatively short time interval (30°) of each commutation phase for sensing the back EMF voltage in this mode is sufficient during steady state operation of the motor and when the motor has a modest acceleration or deceleration. It is favorable if during at least a part of a commutation state one of the motor drive outputs provides a constant supply voltage, a second one of the outputs alternately provides a first and a second supply voltage and a third one is alternately switched between the high impedance state and a state wherein the first power supply voltage is provided synchronously with the second output. Preferably said part of said commutation state is the end of said commutation state, and has a fixed duration.

In a further embodiment the driver assumes the soft switching mode when the relative change in time interval between two subsequent back EMF pulses is less then a predetermined value, and assumes hard switching mode when the relative change is greater than the predetermined value. This makes it possible on the one hand to allow strong accelerations or decelerations, while on the other hand the motor is relatively silent when in steady operation.

In an embodiment the state of the commutation device is controlled by the static positioning sensor if the time interval between two subsequent back EMF pulses is greater than a predetermined time interval. If a time interval greater than the predetermined time interval has lapsed since the last back EMF pulse the motor is either stopped or runs too slow to generate detectable back EMF pulses. By this measure automatically the motor starts up again.

In an embodiment the driver has a first braking mode wherein the remanent kinetic energy of the motor is recuperated into electric energy for recharging the power supply. This has the advantage that a system in which the motor is used has a relatively low average power consumption. In particular in systems wherein the motor speed has to be accelerated and decelerated frequently this is an advantage.

The invention is in particular applicable to a data reading/writing device, such as an optical or magnetic disc drive or a tape drive, e.g. a VCR. Such a data reading/writing device comprises a holder for receiving a data carrier, a motor for moving the data carrier, a motor driver for driving the motor and a read/write unit for reading the data carrier. The invention is however in addition suitable for various other applications where brushless motors are used, such as shavers, fans and blowers.

These and other aspects are described in more detail with reference to the drawing. Therein:

FIG. 1 schematically shows a brushless motor and a driver therefore according to the invention, FIG. 2 shows a part of the driver in more detail, FIG. 2A shows in more detail an aspect of said part, FIG. 3 shows a state diagram, FIG. 4 shows an alternative embodiment of the driver, FIG. 5 schematically shows the amplitude of various signals as a function of the rotational speed of the motor, FIG. 6 shows an embodiment of a further part of the driver, FIG. 7 shows a second of said further part, FIG. 8a to 8c schematically shows various signals in a first operational mode of the driver, FIG. 9a-c schematically shows various signals in a second operational mode of the driver, FIG. 10 schematically shows a data reading/writing device.

FIG. 1 schematically shows a brushless motor 10 and a driver 20, 30, 40 therefore. The motor is schematically represented by the inductance of its coils $11_U$, $11_V$, $11_W$, the resistances $12_U$, $12_V$, $12_W$ of the coils and voltage sources $13_U$, $13_V$, $13_W$ to schematically indicate the induction of voltages in the coils due to the back EMF effect and due to induction by other, energized, windings. The coils are commonly connected to a star point 14.

The driver comprises a controller 20, an output stage 30 having a plurality of modules $30_U$, $30_V$, $30_W$ which each feed a respective phase coil $11_U$, $11_V$, $11_W$ of the multi-phase brushless motor 10. Preferably the motor is a three-phase motor, and the output stage 30 has a corresponding number of phases. Alternatively the motor can have another number of phases, e.g. 2 or a number higher than 3. However, it has been found that a three phase motor and associated motor driver can be manufactured most economically, while the motor can have a good performance, e.g. a low ripple. The driver shown in FIG. 1 has a back EMF detector 40 comprising a preamplifier section 41 coupled to the coils, a filter 42 for filtering an output of the preamplifier and a comparator 43. In the embodiment shown each coil is coupled to an input of a respective preamplifier. The preamplifiers each further have a reference input. The reference inputs are commonly coupled to the star point 14. The controller 20 serves as a commutator for controlling the modules of the output stage. The commutator selectively enables the modules $30_U$, $30_V$, $30_W$ of the output stage 30. This selective enabling is alternated with a commutation frequency $F_E$. The commutation frequency $F_C$ linearly depends on the rotational speed ($V_R$) of the motor 10, also denoted as speed of the motor according to the following relation, wherein $N_P$ is the number of pole pairs.

$$F_C = V_R \cdot N_P$$

The controller 20 may be implemented as a suitably programmed general-purpose processor or as dedicated hardware.

The filters 42 in the back EMF detector have a relatively strong high frequency transfer characteristic at a relatively high commutation frequency, corresponding to a relatively high speed of the motor 10 and a relatively weak high frequency transfer characteristic at a relatively low commutation frequency, corresponding to a relatively low speed of the motor. To that end the filters 42 are controlled by a signal Fon from the controller in the embodiment shown, which switches the filter on if the commutation frequency is less than a predetermined value, e.g. 43 Hz, and off if the commutation frequency exceeds said value. E.g. for a motor having six pole pairs this would correspond to a speed of 430 RPM. Alternatively it is possible to use a filter for which the frequency transfer characteristic is gradually changed from low-pass with a low cut-off frequency at a relatively low commutation frequency to low-pass with a relatively high cut-off frequency at a relatively high commutation frequency.

The controller 20, shown in more detail in FIG. 2, has a commutating device 21 for alternatingly enabling respective modules $30_U$, $30_V$, $30_W$ of the output stage 30 depending on the position of the motor. It receives the sensed position φ from selection element 24. The selection element 24 receives a control signal $S_{PD}$ to select either the output signal $φ_S$ from static positioning sensor 22 or the output signal $φ_D$ from dynamic position sensor 23. The control signal $S_{PD}$ is provided by a state machine 28, the operation of which is described in more detail with reference to FIG. 3. Both the static and the dynamic position device use the signals IND detected in a non-energized winding.

To that end the controller comprises a further selection element 27 having inputs coupled to each of the windings of motor for receiving the signals $U_{IND}$, $V_{IND}$, $W_{IND}$. The further selection element 27 is controlled by a selection signal $S_{UVW}$ that is provided by the commutating device. The state of the state machine depends on the commutation frequency. As a fixed linear relation exists between the speed and the commutation frequency, state of the state machine 28 may be based on a measured value of the speed obtained from a speed detector 25, which determines the speed of the motor on the basis of the selected signal IND induced by back EMF. Alternatively the commutation device may provide a signal indicative for the commutation frequency. An acceleration detector 26 calculates the acceleration from this signal ω and provides a signal $\bar{\omega}$ indicative for the acceleration to the state machine 28. The state machine 28 further receives a control signal ADC that is indicative for a desired torque. In response to these signals the state machine 28 determines the current operational mode and accordingly controls the signals $S_{PD}$, and Fon. The state machine further provides an output signal $C_{PWM}$ for controlling a pulse width modulation unit 29 for regulating a strength of the current supplied by the output stage 30. Various options are available for determining or estimating the momentaneous value of the current I, as illustrated in FIG. 2A. In a preferred embodiment an amplitude of the back EMF voltage $V_{BEMF}$ is calculated in multiplier 28A from the momentaneous motor speed ω using the relation $$V_{BEMF} \approx k \cdot \omega,$$

I.e. the generated back EMF voltage is proportional to the product of the motor constant k and the rotational speed ω.

The value for the rotation speed ω is obtained from the speed detector 25, which calculates the rotational speed from the frequency with which the back EMF pulses occur but can alternatively be a signal generated by the commutating device 21, as the commutating device is phase locked to the motor. The motor constant k may be stored as a fixed value, but may alternatively be stored in a programmable register 28B, so that the driver can easily be adapted for various motors. Alternatively the value k may be represented by the impedance value of a component, e.g. the resistive value of a resistor, which can be soldered to the driver. A subtractor 28C subtracts the estimated back EMF voltage from a supply voltage Vin supplied to the motor to estimate the current, which would be consumed, by the motor at a 100% duty cycle. An estimation for the actual current consumed at a duty cycle δ is obtained by multiplication with the value for this duty cycle in multiplier 28E. Instead of calculating the value for the back EMF voltage from the rotation speed of the motor, it may be measured by a voltage measuring unit 28F using the back EMF signals from multiplexer 27. In another embodiment the controller 20 may have an input for receiving a current sense signal Isense indicative for the actual current. Estimating the current with a circuit as shown in FIG. 2A however, has the advantage that power dissipation in a sense resistor is prevented. Also the motor has a greater voltage margin. In order to enable a reliable detection of back EMF pulses the pulse width modulation unit 29 controls the strength of the current at a predetermined maximum value until the motor 10 has a predetermined minimum speed, and it controls the current at a value determined by an input signal when commutation frequency has exceeded said predetermined minimum value. Depending on the type and size of the motor the predetermined minimal value for the commutation frequency may be in a range of 10-100 Hz, for example 43 Hz. The actual physical rotational speed $V_R$ of the motor depends on the above-mentioned relation.

In this case, where the motor has six pole pairs this corresponds to a rotation frequency $V_R$ of 430 RPM. The predetermined current preferably has the maximum value that can be supplied during the time it takes to startup. A suitable predetermined current was found to be 2 A.

The preamplifier section 41 of the back EMF detector has a controllable threshold unit for suppressing the back EMF signal until a threshold value until the commutation frequency has reached the predetermined minimum value. The conversion of the back EMF signal involves a comparison to determine the zero crossing of this signal. In practice the exact level at which zero crossing is detected turns out to be subject to a certain tolerance, e.g. inherent mismatch in the IC process. This would entail that part of the products would have to be rejected because the back EMF detector is to sensitive and detects false zero crossings. By suppressing the back EMF signal until a threshold value in the start-up phase of the motor false zero-crossings are prevented. The threshold value should be slightly higher than the worst occurring deviation from the zero-crossing level. The applied threshold voltage may be adapted either gradually with the speed of the motor or may be changed in one or more discrete steps. The most suitable threshold value depends on the particular implementation of the back EMF detector, and may be comprised in a range of 5 to 30 mV for example. It was found that a practical value was 15 mV.

The threshold voltage is enabled with the signal Oon from state machine 28 when the motor has a speed below 430 RPM corresponding to the above mentioned minimum commutation frequency of 43 Hz.

FIG. 3 shows a state diagram for the state machine 28 of the controller 20 of the brushless motor driver according to the present invention. After power-on, the state machine assumes the reset state RESET. In order to cause the motor 10 to start, a signal ADC indicative for a desired torque is provided. In the embodiment described herein a value ADC <=125 causes the motor to brake, at a value >=130 the driver 20, 30, 40 accelerates or decelerates the motor to a rotational speed corresponding to the ADC value, and for a value 125<ADC<130 the torque is zero. This implements the dead zone in the input-output-transfer characteristics of the driver. In the reset state RESET the driver can be activated by setting the signal ADC to a value >=130. This causes the controller 20 to assume the state SPS in which the controller starts a static position sensing scheme as described in U.S. Pat. No. 6,204,617. In this state the state machine causes the selection element 24 with control signal $S_{PD}$ to select the static position signal $\phi_S$ from the static position sensor 22. During the state SPS the state machine 28 controls energizes the windings with a relatively weak current, or with a short current pulse that is insufficient to cause a rotation of the motor. When the static position-sensing scheme is finished the state machine enters the startup mode STARTUP. Irrespective of the exact value of the signal ADC (as long as it is >=130) the motor is supplied with the predetermined maximum current $I_{MAX}$ in this state. In addition the threshold voltage is enabled with the signal Oon, and the filter 42, 142 is set with signal Fon in a mode with relatively weak high frequency transfer characteristic. If no back EMF pulse is detected within a predetermined time interval, e.g. in the range of 100 ms to 1 s, the state machine 28 returns to SPS mode. If the predetermined time interval were less than 100 ms, e.g. 50 ms it could happen that the operation of the motor is incorrectly interrupted. If the predetermined time interval is longer than 1 s, e.g. 2 s, the time for restart in case of failure would be unnecessarily long. A typical predetermined time is 300 ms.

As soon as the motor 10 has achieved a commutation frequency $F_C$ that exceeds the predetermined minimum value $F_T$, 43 Hz in this example, the state machine 28 assumes the forward driving mode FORWARD. In that driving mode the motor current is no longer fixed at the predetermined maximum current $I_{MAX}$, but is released for control by the user via the input signal ADC. In the forward driving mode the PWM controller maintains the sensed motor current Isense at a level corresponding to a value set by the user via input signal ADC.

The forward driving mode has two sub modes, high-speed sub-mode, in which the motor is driven with a commutation frequency higher than a predetermined threshold frequency, and low-speed sub-mode in which the motor is driven with a commutation frequency lower than said predetermined threshold frequency $F_T$. In the present embodiment the predetermined threshold frequency is equal to the predetermined minimum value, 43 Hz, at which the operational mode of the state machine 28 transits from STARTUP to FORWARD, thereby reusing this comparator hardware. Hence, directly after this transition the state machine 28 assumes the high-speed sub-mode. However, if the commutation frequency decreases below that threshold frequency $F_T$ the low-speed sub-mode is assumed. In the low-speed sub-mode the threshold voltage is re-enabled with the signal Oon, and the filter 42 is set in a mode with relatively weak high frequency transfer characteristic with signal Fon. In the high-speed sub-mode the threshold voltage is disabled and the filter 42 is set in a mode with a relatively strong high frequency transfer characteristic with the signal Fon.

If the signal ADC is given a value <=125 the controller assumes one of the modes ACTIVE BRAKE or SHORT BRAKE, depending on the commutation frequency. If the commutation frequency is higher than a further threshold frequency $F_{T2}$, here 22 Hz, the mode ACTIVE BRAKE is selected. Therein the power supply is used to generate a decelerating torque in the motor. As in the FORWARD mode the ACTIVE BRAKE MODE has a low speed sub-mode and a high-speed sub-mode. The filters 42 and the threshold for the preamplifier section 41 are controlled analogously as in FORWARD mode. As soon as the commutation frequency has decreased below the further threshold speed $F_{T2}$ the controller assumes short brake mode SHORT BRAKE.

The purpose of going to short brake at 22 Hz is to prevent reverse rotation.

This causes the motor to brake with short-circuited motor terminals. If no back EMF pulse is detected during a further predetermined time interval, which may be equal to the earlier mentioned predetermined time interval, e.g. 300 ms, the controller subsequently assumes STOP mode. In this mode the short-circuiting of the motor terminals is ended and power is switched off. Alternatively the power can be switched off already in the SHORT BRAKE mode.

FIG. 4 shows an alternative embodiment wherein elements of the back EMF detector are shared. Parts therein corresponding to those in FIG. 1 have a reference numeral that is 100 higher. In this embodiment the back EMF detector 140 comprises a multiplexer 144, which alternatingly selects one of the windings of the motor, i.e. the winding which is not energized and provides the signal received from that winding to the preamplifier 141. The selection element 144 is controlled by control signal $S_{UVW}$ provided by the commutator 21. In this embodiment the selection element 27 in the controller 20 is superfluous.

FIG. 5 schematically shows the generated back EMF voltage and the PWM switching interference as a function of the rotational speed. At a relatively low rotational speed, here less than 400 RPM, the back EMF signal is relatively weak, but the filter suppresses the relatively high frequency switching interference caused by the PWM unit 29, so that the back EMF signal is still well detectable. At a relatively high rotational speed, >400 RPM, the switching interference is no longer suppressed, but the amplitude of the back EMF signal has increased sufficiently to be well detectable. The back EMF voltage is zero at zero rotational speed. Nevertheless, the sensitivity of the system at startup has a non-zero "back EMF" signal due to the programmed offset in the signal path of the back EMF comparator. The back EMF zero-crossing comparators only flip when the back EMF signal exceeds the offset value. This explains the non-zero back EMF signal at 0 RPM. However, due to the high initial start current $I_{MAX}$ the rotational speed of the motor is sufficiently accelerated in STARTUP mode to provide a first back EMF pulse that is already sufficiently strong for detection.

FIG. 6 shows an embodiment of a module for the output stage 30, 130. In Figure parts corresponding to those in FIG. 1 have a reference numeral that is 200 higher. The module, e.g. 30U comprises a bridge having a high side switch 231a, and a low side switch 231b, a control buffer 232a, 232b for controlling the high-side switch and the low side switch respectively, and a zener diode 233. The control buffers have inputs $C_{UH}$ and $C_{UL}$ for switching the value of the output signal.

The modules need to have a high impedant off state in order not to disrupt the back EMF sensing phase of commutation. The zener diode 233 provides gate-to-source voltage protection of high-side power switch 231a. This has however the disadvantage that the bias current for the zener diode 233 will flow to the output 234 disrupting the back EMF sensing.

FIG. 7 shows a second embodiment in which the high-side switch is protected with a separate source path 336 and sink path 335. Parts therein corresponding to those in FIG. 5 have a reference number that is 100 higher. The separate source 336 and sink 335 paths can fast sink and source the current from the control buffer 332a.

Table 1 schematically shows the commutation states 1-24 of the driver in a hard switching operational mode SPEEDY. Each of the states applies to a particular position range of the motor. State n applies to the range $(n-1)\cdot15°\leq\phi<n\cdot15°$. This table shows the state of each of the output modules 30U, 30V, 30W of the output stage 30. For example $C_{UH}$ and $C_{UL}$ respectively are the logic values of the control voltages for the high-end and the low-end switching elements 231a, 231b for module 30U of the output stage 30. The control signals $C_{VH}$, $C_{VL}$ for module 30V, and control signals $C_{WH}$, $C_{WL}$ for module 30W are analogously defined. A value 1 indicates that the switching element is controlled by the control voltage in a conducting mode, also denoted as enabled. A value 0 indicates that the switching element is controlled by the control voltage in a non-conducting mode, also denoted as disabled. A value P indicates that the switching element is alternately controlled in a conducting and a non-conducting mode according to the PWM signal. A value Pi also indicates that the switching element is alternately controlled in a conducting and a non-conducting mode according to the PWM signal, but in counter phase to the element controlled by P. During each state of the commutation device 21 one of the motor drive outputs $U_O$, $V_O$, $W_O$ provides a constant supply voltage, a second one of the outputs alternately provides a first and a second supply voltage and a third one is kept in a high impedance state. For example during commutation state 1, the high end switch of output module 30U is enabled, and the low end switch is disabled, so that its output 234 is provided with a first supply voltage Vdd. In commutation state 1 both switches of module 30V are disabled, so that its output is in a high impedance state. In state 1 the high-end 231a and the low-end 231b switches of module 30W are alternately enabled and disabled by the PWM controller. The high-end switch 231a is switched in counter phase (Pi) to the low-switch 231b (P).

Each of the switches is controlled with a switching scheme in which it is subsequently enabled for 4 states (1), switched with PWM control during 2 states (P), disabled during 4 states (0), switched with reverse PWM control during 2 states (Pi), disabled during 4 states (0), switched with reverse PWM control during 2 states (Pi), disabled during 4 states (0) and switched with PWM control during 2 states (P).

The switching scheme for the low-end switch 231b of a pair is shifted in time 12 states (180°) with respect to its high-end counterpart 231a.

Each module has a module-switching scheme comprising the switching schemes for its both switches. The module switching schemes for the three modules are mutually shifted by 8 states (120°), i.e. state n mod 24 of the module switching scheme for module 30U corresponds to state (n+8) mod 24 for module 30W and to state (n+16) mod 24 for module 30V.

Table 2 shows the hard switching reverse mode, which can be used to actively brake the motor. As can be seen therein each switch is subsequently enabled with reverse PWM control during 4 states, disabled during 6 states, enabled during 2 states, enabled with PWM control during 4 states, enabled during 2 states and disabled during 6 states. As in the hard switching forward mode the switching scheme for the low-end switch 231b of a pair is shifted in time 12 states (180°) with respect to its high-end counterpart 231a. Also the module switching schemes for the three modules are mutually shifted by 8 states (120°.

FIG. 8a to 8c schematically shows the various signals involved as a function of time t. Therein FIG. 8a shows the voltage $U_O$—GND provided by module $30_U$ with reference to ground.

FIG. 8b shows the current $I_U$ through the winding $11_U$.

FIG. 8c shows the voltage $U_O$—U* provided by module $30_U$ with reference to the star point 14, 114

Figure 1:
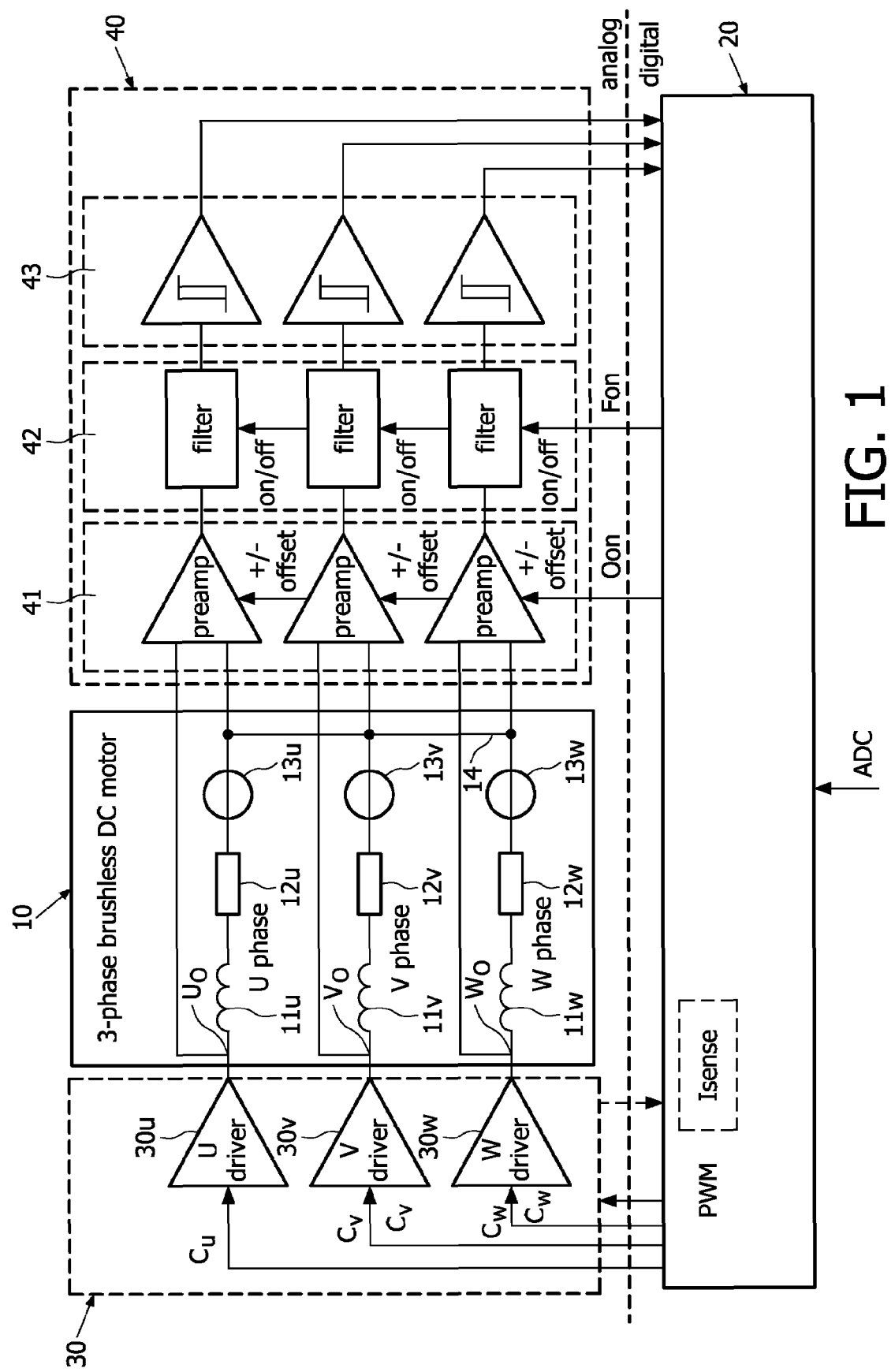
Figure 2:
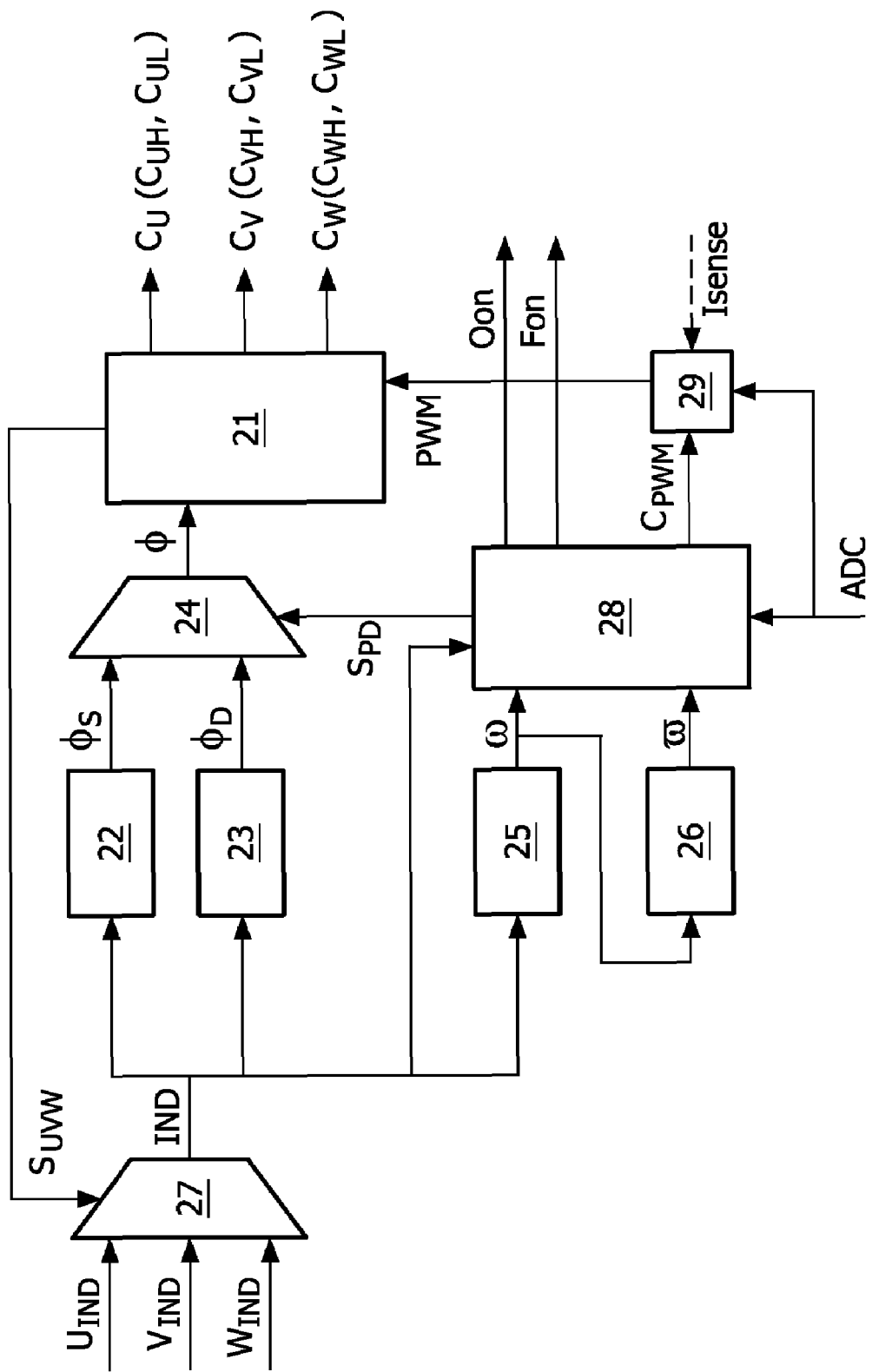
Figure 2A:
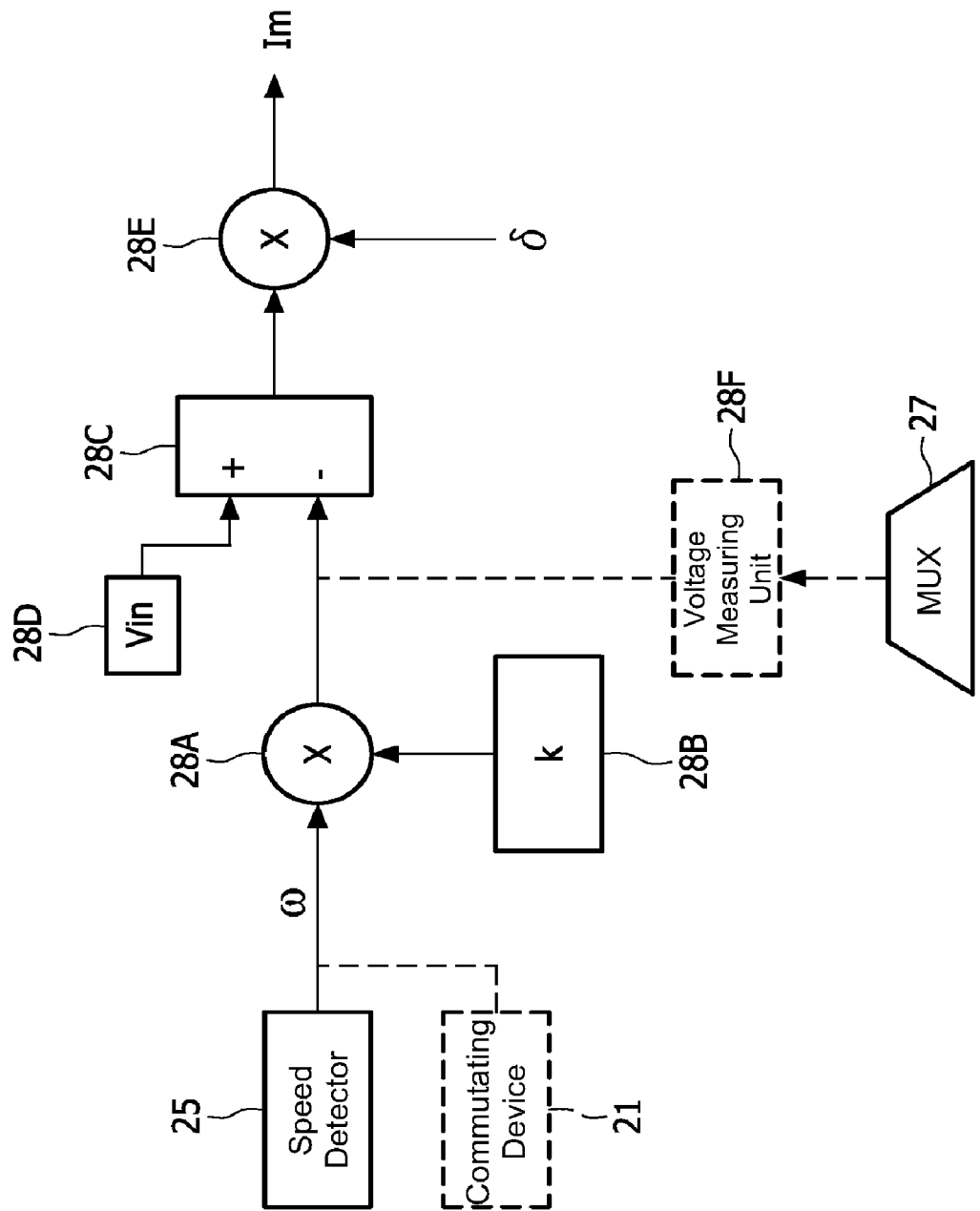

Table 3 illustrates the soft-switching forward mode. Advantage of the soft switching mode is that the motor current has a more "sine-like" behavior than driving in hard switching mode, so that audible noise is reduced. The soft switching forward mode differs from the hard switching mode in that it has at least a state during which two output modules simultaneously and in phase provide an output voltage alternating between the first and the second power supply voltage. E.g. for example during state 2 the modules 30V and 30 W simultaneously provide a first supply voltage (Vss) during a first part of the PWM cycle and a second supply voltage (Vdd) during the complementary part of the PWM cycle.

In addition, during at least a part of a state of the commutation device 21 one of the motor drive outputs provides a constant supply voltage, a second one of the outputs alternately provides a first and a second supply voltage and a third one is alternately switched between the high impedance state and a state wherein the first power supply voltage is provided synchronously with the second output. For example during state 3 the output of module 30U provides a the second supply voltage Vdd, the output of module 30V alternately provides a first supply voltage (Vss) during a first part of the PWM cycle and the second supply voltage (Vdd) during the complementary part of the PWM cycle, and during at least a part of state 3 the output of module 30W alternately provides the first supply voltage (Vss) during a first part of the PWM cycle and is in a high impedance state during the complementary part of the PWM cycle.

It was found to be particularly favorable if this part of the commutation state wherein the output alternatingly provides the first voltage and is in a high impedance state is at the end of said commutation state, and has a fixed duration, here 80 us. During the beginning of said commutation state the output should be switched as in the preceding state. This enables a gradual discharge of the associated coil. As this has a fixed duration, the relative duration as compared to the duration of one commutation state increases with increased speed of the motor. During the fixed last part of the commutation state the duty-cycle is reduced in a fixed number, e.g. 8 steps, from the momentaneous duty cycle P to 0%. In case the switch was enabled (1), the duty cycle is stepwise reduced from 100% to 0%.

It can be seen in table 1 that the a switch is kept enabled (1) during 4 commutation states, is switched with pulse width modulation (P) during 3 commutation states, is kept disabled (0) during 2 states, is switched with inverse pulse width modulation (Pi) during 3 commutation states, is kept disabled (0) during 4 commutation states, and again switched with inverse pulse width modulation (Pi) during 3 commutation states, where in the last part of the third state the switch is disabled (0) and kept disabled (0) during the two subsequent states, and is subsequently switched with pulse width modulation (P) during 3 commutation states.

As in the other switching modes the switching scheme for the low-end switch 231b of a pair is shifted in time 12 states (180°) with respect to its high-end counterpart 231a. Also the module switching schemes for the three modules are mutually shifted by 8 states (120°).

Figures 9A, 9B, 9C:
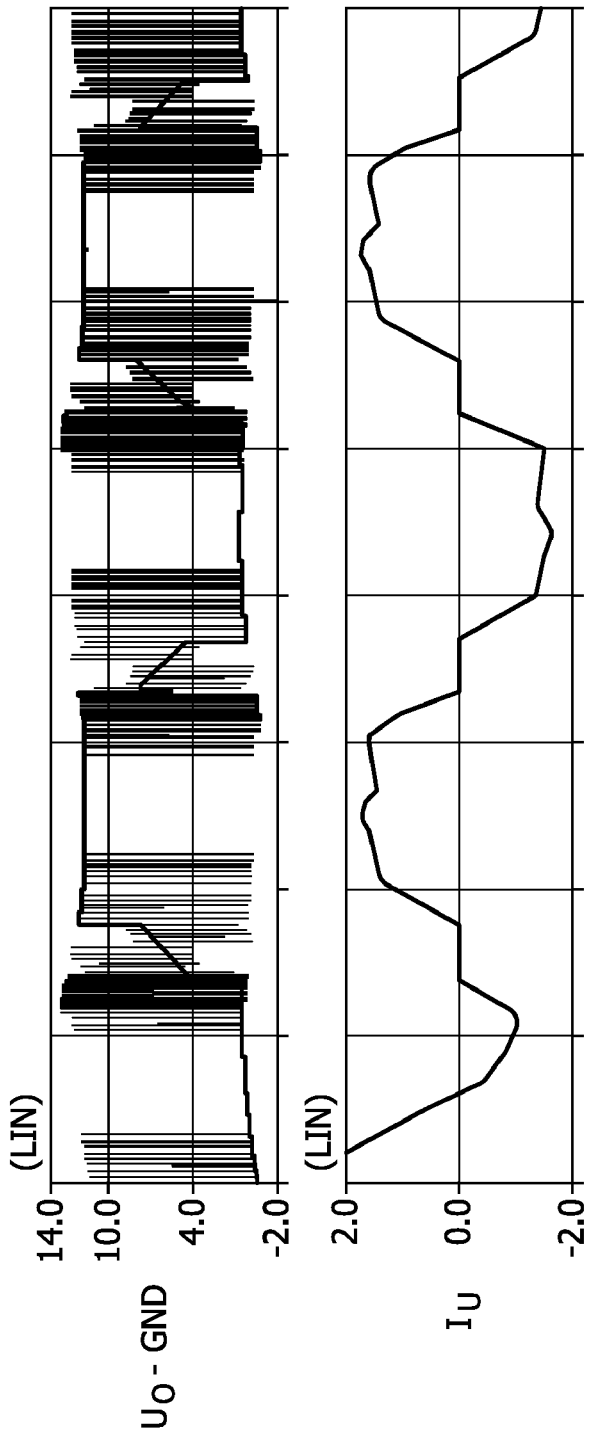

FIG. 9a-c schematically shows the signals involved. The shape of the current $I_U$ consumed by the motor is remarkably smoother than in the case of the hard switching forward mode.

FIG. 9a shows the voltage $U_O$—GND provided by module $30_U$ with reference to ground.

FIG. 9b shows the current $I_U$ through the winding $11_U$.

FIG. 9c shows the voltage $U_O$—U* provided by module $30_U$ with reference to the star point 14, 114.

Table 4 shows the soft-switching reverse mode, which is suitable for relatively slowly, but actively braking the motor with a relatively low audible noise level.

In the soft switching reverse mode the commutator has at least one state during which a first and a second output of the output stage both provide a first supply voltage Vdd, while a third output alternately provides the first supply voltage Vdd and a second supply voltage Vss. A full switching cycle for a particular switch comprises the following sequence: Switching the switch with inverse pulse width modulation (Pi) during 4 states, keeping the switch disabled (0) during 5 states, keeping the switch enabled (1) during 3 states, switching the switch with pulse width modulation (P) during 4 states, keeping the switch enabled (1) during 2 states and during a first part of the state succeeding those 2, after which first part the switch is disabled and kept disabled during 5 succeeding states. As in the other switching modes the switching scheme for the low-end switch 231b of a pair is shifted in time 12 states (180°) with respect to its high-end counterpart 231a. Also the module switching schemes for the three modules are mutually shifted by 8 states (120°).

Figure 3:
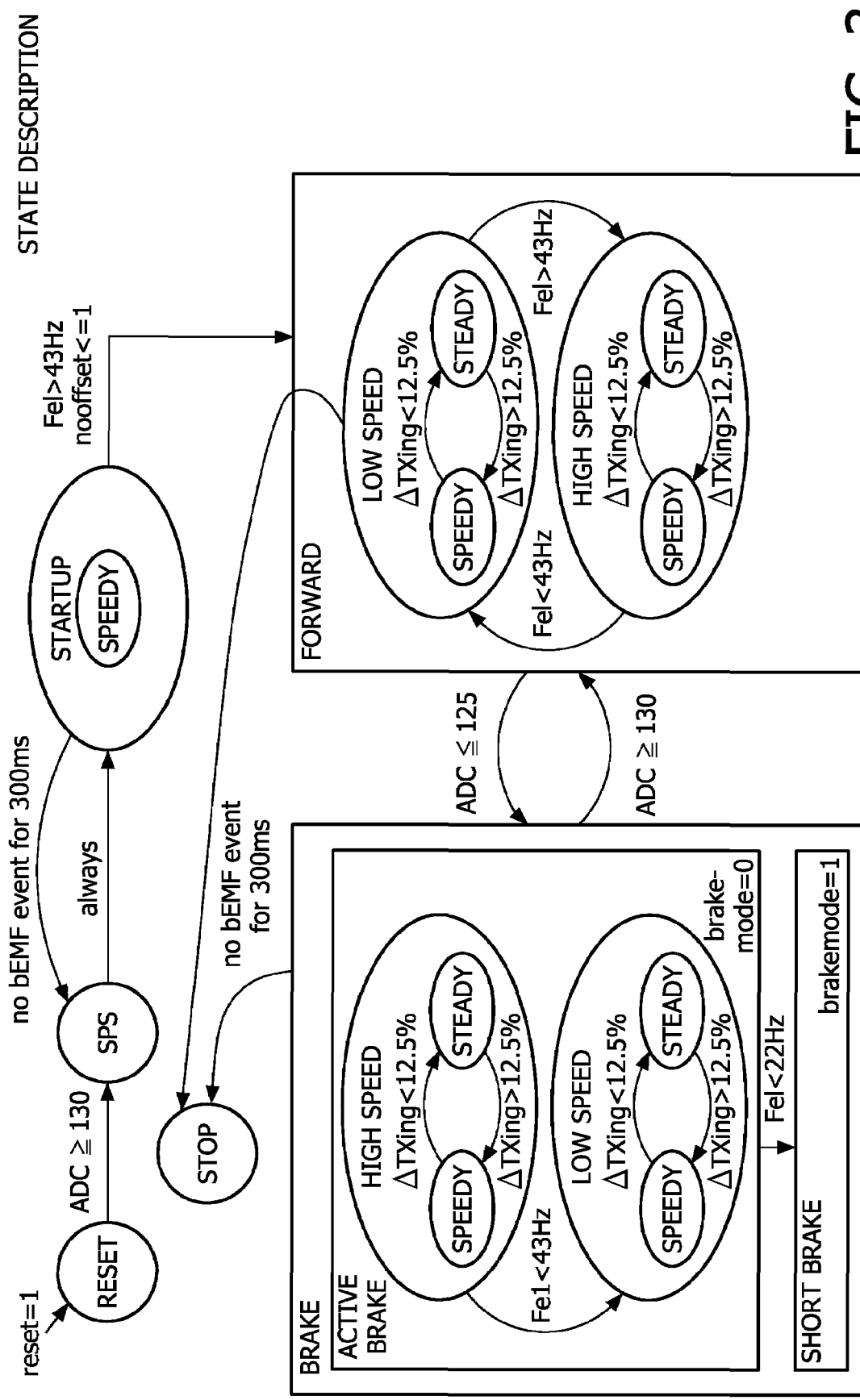
Figure 4:
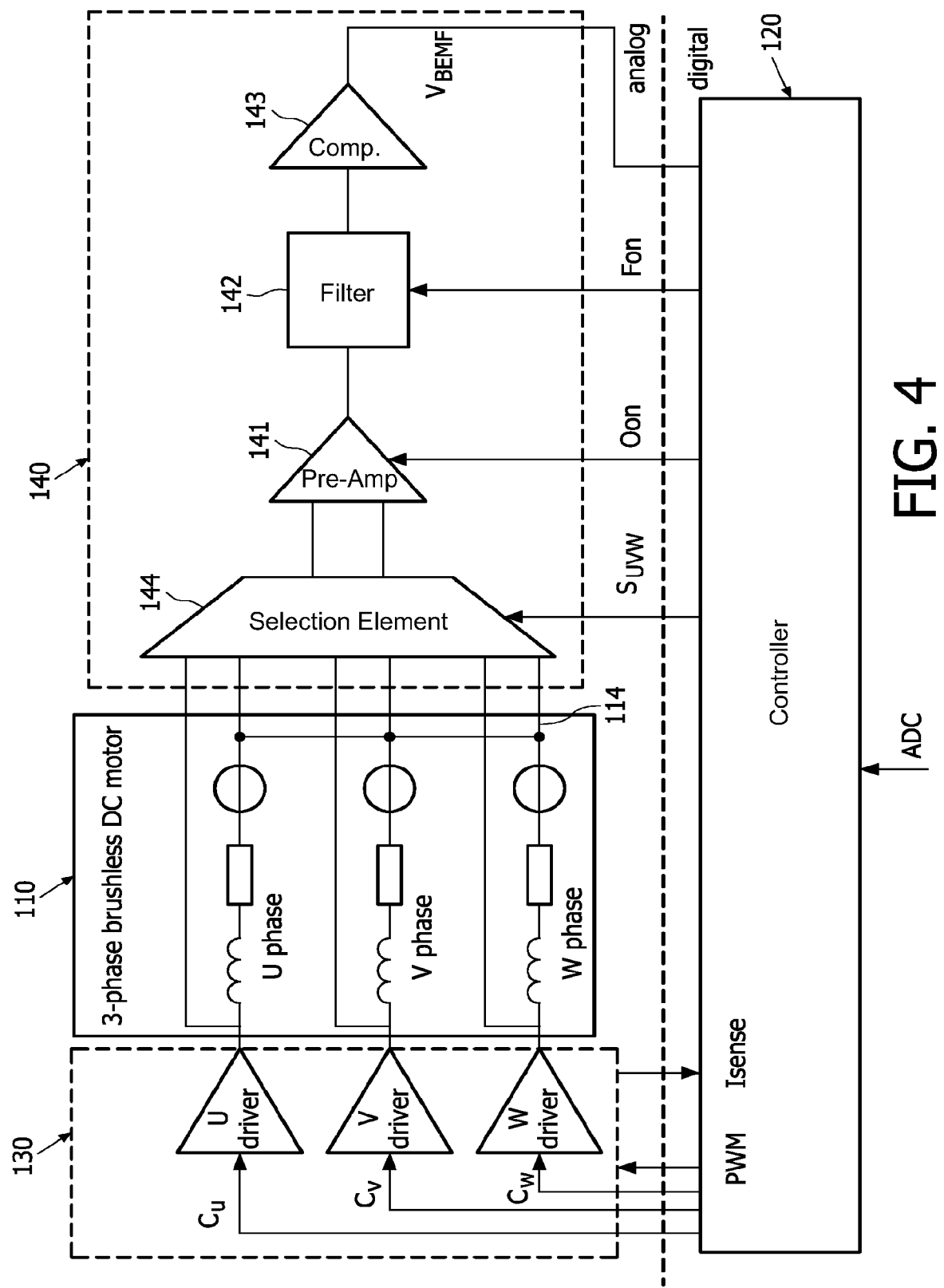
Figure 5:
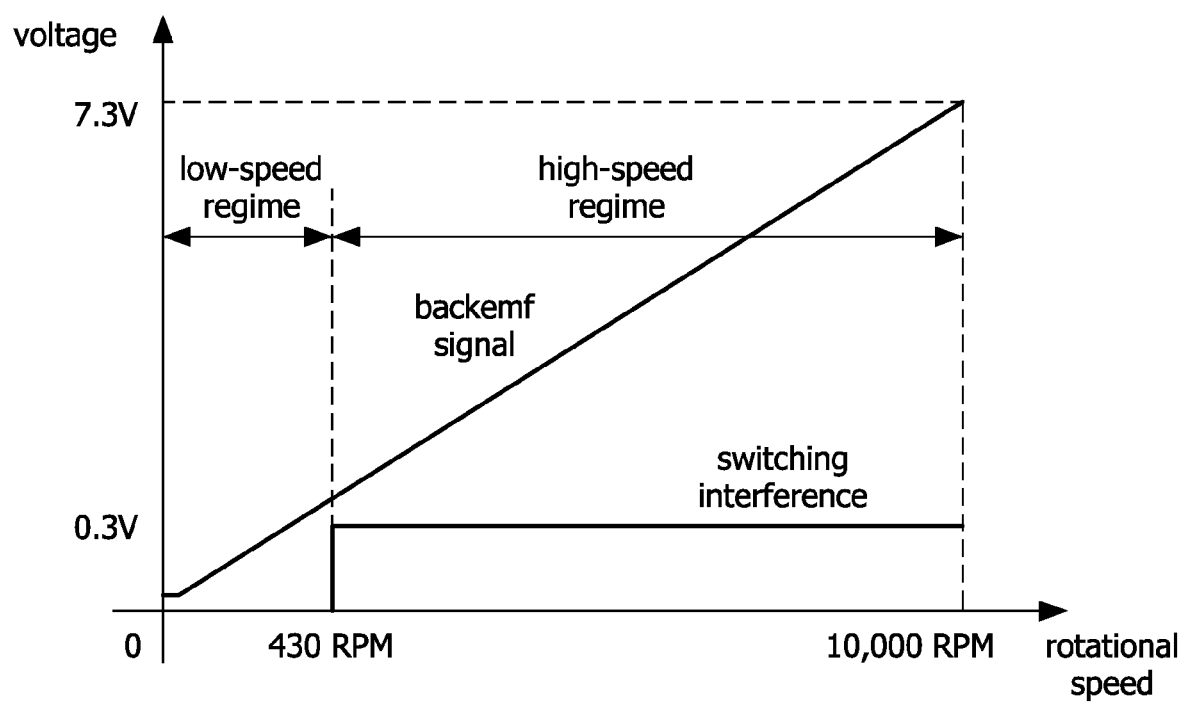
Figure 6:
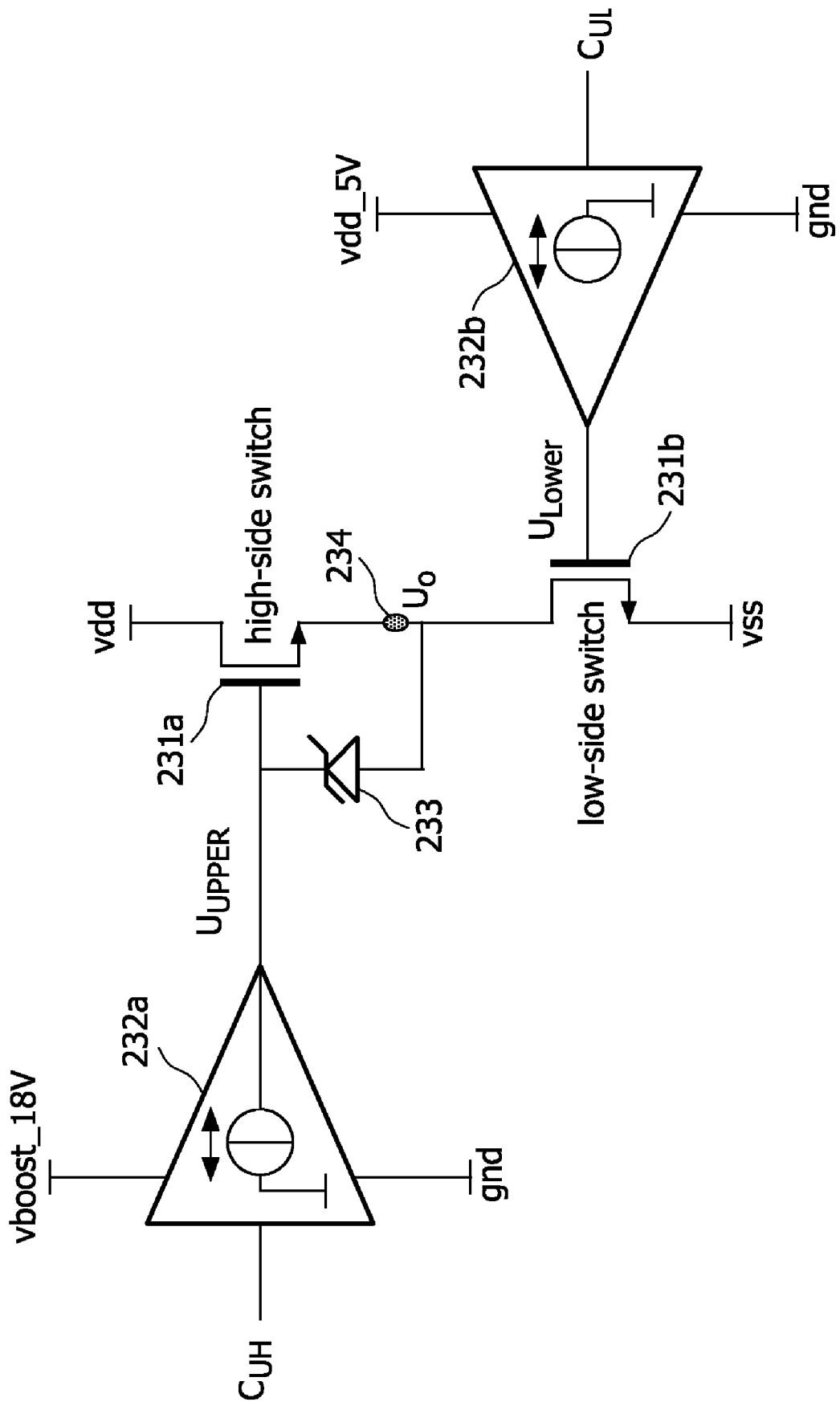
Figure 7:
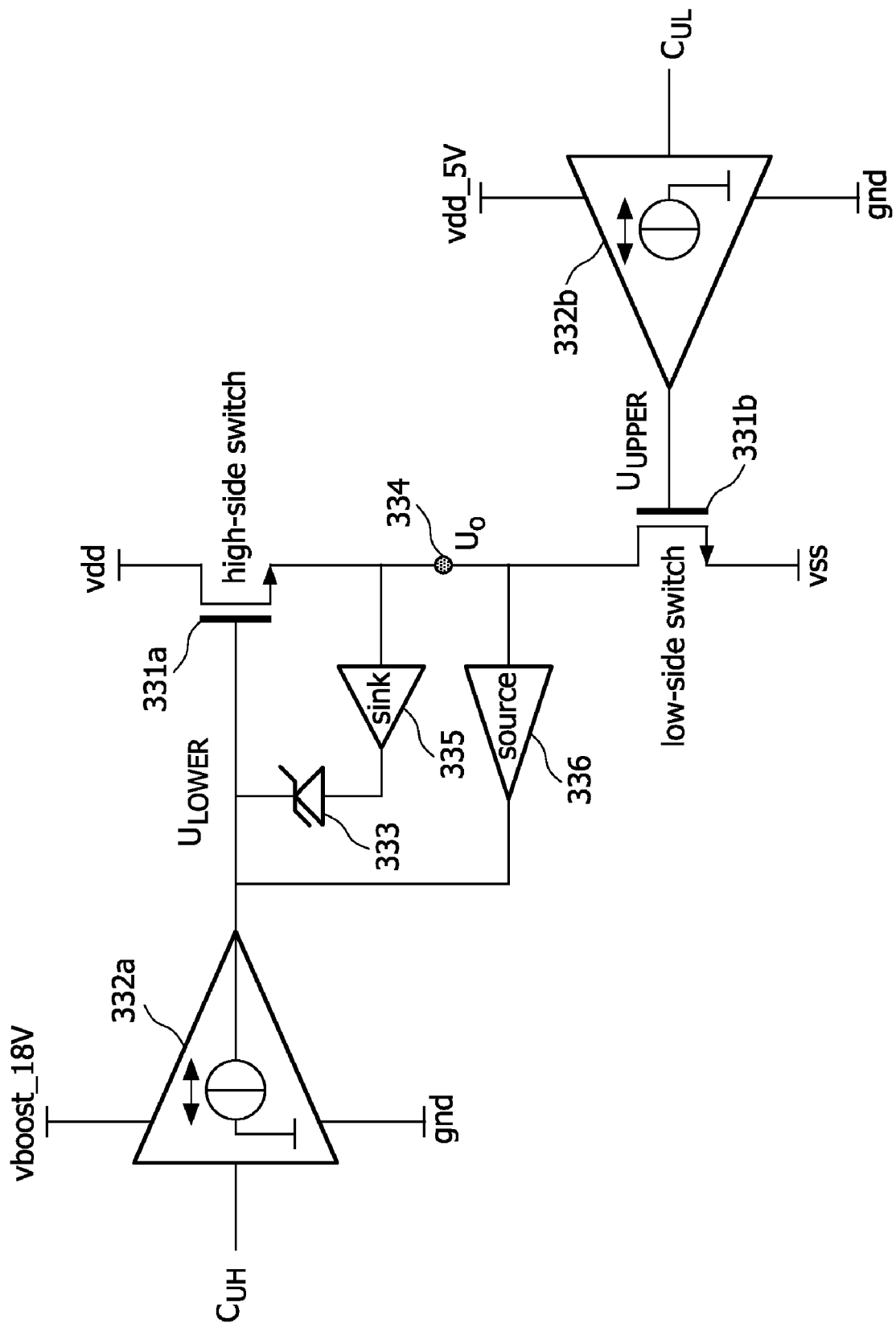

Referring again to FIG. 3, it can be seen that each of the sub-modes LOW SPEED and HIGH SPEED in each of modes ACTIVE BREAK and FORWARD have sub-sub-modes SPEEDY and STEADY. The preferred embodiment of the driver, when in FORWARD mode assumes the sub-sub-mode STEADY when the relative change in time interval between two subsequent back EMF pulses is less then a predetermined value. In the sub-sub-mode STEADY the driver applies the soft switching forward mode as shown in table 3. When the relative change between two subsequent back EMF pulses is greater than the predetermined value the driver assumes the SPEEDY sub-sub-mode in which it applies the hard switching forward mode as shown in table 1. A suitable predetermined value may be in the range of 10 to 15%. If the predetermined value were greater than 15%, e.g.

20%, it may happen that the driver is still operating in a soft-switching forward mode when the motor has a fast acceleration, in which case the acceleration may be hampered. If the predetermined value is smaller than 10%, e.g. 5%, it may happen that even at a relatively low acceleration the motor is still operating in a hard-switching forward mode and therewith making unnecessary noise.

Likewise, in the BRAKE mode the driver assumes the sub-sub-mode STEADY when the relative change in time interval between two subsequent back EMF pulses is less then a predetermined value. In the sub-sub-mode STEADY of the BRAKE mode the driver applies the soft switching forward mode as shown in table 4. When the relative change between two subsequent back EMF pulses is greater than the predetermined value the driver assumes the SPEEDY sub-sub-mode in which it applies the hard switching break mode as shown in table 2.

Figure 10:
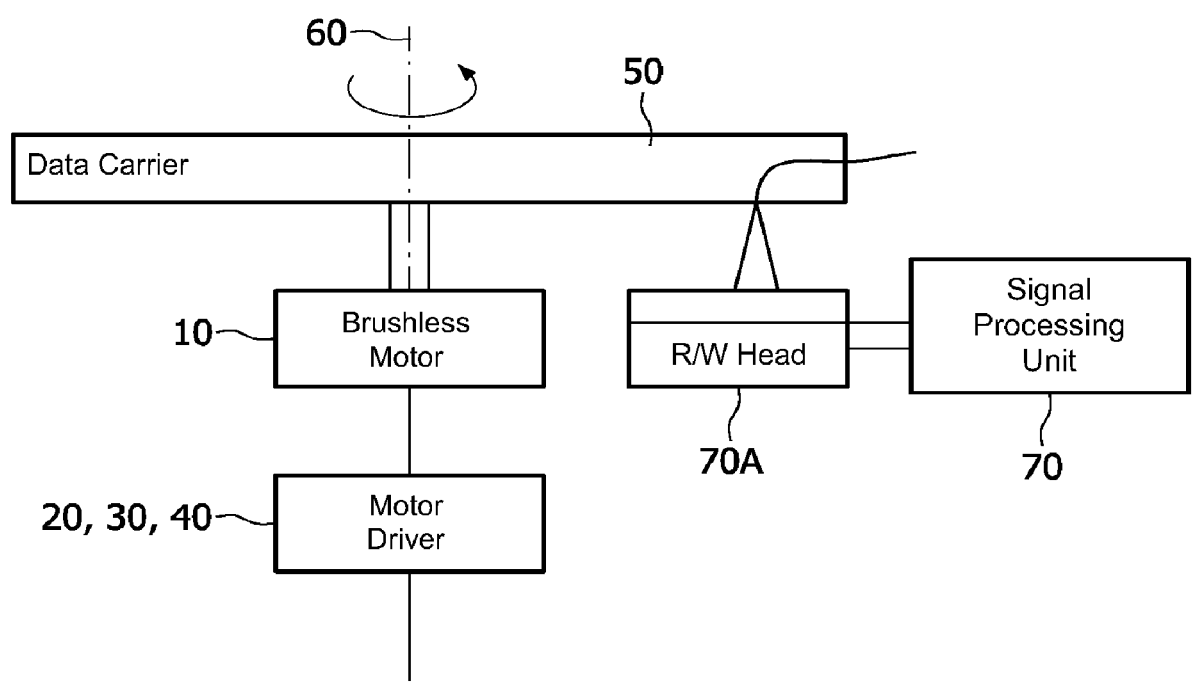

FIG. 10 schematically shows a data reading/writing device. It comprises a holder (here axis 60) for receiving a data carrier 50. The axis is rotated by a motor 10 so as to move the data carrier. The motor is driven with a motor driver 20, 30, 40 as described above. The data reading/writing device has a read/write unit 70, 70A comprising a read/write head 70A and signal processing unit 70. The data reading/writing device may be arranged for reading data, writing data or both. In a device arranged for reading the signal processing unit 70 converts a signal provided by the read/write head into an output signal. The signal-processing unit 70 may comprise conventional modules for filtering, amplification, A/D conversion, channel decoding, error detection and correction for reading the data carrier. In a device arranged for writing the signal processing unit 70 converts an input signal into a suitable signal for writing the data carrier using modules for D/A conversion, filtering, amplification, error correction encoding, channel encoding etc. Various technologies are available for writing a data carrier, e.g. magnetical or optical. The read head 70A may be positioned by one or more actuators.

It is remarked that the scope of protection of the invention is not restricted to the embodiments described herein. Although the driver of the motor has been described in particular in the context of its application in a read/write device, it may be used in various other devices, such as shavers, blowers, and fans. Various settings of the driver may be programmable, e.g. by programming a value in a control register, such as the predetermined minimal motor speed, the motor speed at which the controller changes from active brake to short brake, the time limit for detecting a back EMF pulse, the setting for the predetermined value for the relative change between two subsequent back EMF pulses. Parts of the system may be implemented in hardware, software or a combination thereof. The word 'a(n)' preceding an element does not exclude a plurality of those elements. Means forming part of the invention may both be implemented in the form of dedicated hardware or in the form of a programmed general-purpose processor. The invention resides in each new feature or combination of features.

TABLE 1

Hard-switching forward mode

| state | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| $C_{UH}$ | 1 | 1 | 1 | 1 | P | P | 0 | 0 | 0 | 0 | Pi | Pi | 0 | 0 | 0 | 0 | Pi | Pi | 0 | 0 | 0 | 0 | P | P |
| $C_{UL}$ | 0 | 0 | 0 | 0 | Pi | Pi | 0 | 0 | 0 | 0 | P | P | 1 | 1 | 1 | 1 | P | P | 0 | 0 | 0 | 0 | Pi | Pi |
| $C_{VH}$ | 0 | 0 | Pi | Pi | 0 | 0 | 0 | 0 | Pi | Pi | 0 | 0 | 0 | 0 | P | P | 1 | 1 | 1 | 1 | P | P | 0 | 0 |
| $C_{VL}$ | 0 | 0 | P | P | 1 | 1 | 1 | 1 | P | P | 0 | 0 | 0 | 0 | Pi | Pi | 0 | 0 | 0 | 0 | Pi | Pi | 0 | 0 |
| $C_{WH}$ | Pi | Pi | 0 | 0 | 0 | 0 | P | P | 1 | 1 | 1 | 1 | P | P | 0 | 0 | 0 | 0 | Pi | Pi | 0 | 0 | 0 | 0 |
| $C_{WL}$ | P | P | 0 | 0 | 0 | 0 | Pi | Pi | 0 | 0 | 0 | 0 | Pi | Pi | 0 | 0 | 0 | 0 | P | P | 1 | 1 | 1 | 1 |

TABLE 2

Hard-switching reverse mode

| State | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| $C_{UH}$ | Pi | Pi | Pi | Pi | 0 | 0 | 0 | 0 | 0 | 0 | 1 | 1 | P | P | P | P | 1 | 1 | 0 | 0 | 0 | 0 | 0 | 0 |
| $C_{UL}$ | P | P | P | P | 1 | 1 | 0 | 0 | 0 | 0 | 0 | 0 | Pi | Pi | Pi | Pi | 0 | 0 | 0 | 0 | 0 | 0 | 1 | 1 |
| $C_{VH}$ | 0 | 0 | 1 | 1 | P | P | P | P | 1 | 1 | 0 | 0 | 0 | 0 | 0 | 0 | Pi | Pi | Pi | Pi | 0 | 0 | 0 | 0 |
| $C_{VL}$ | 0 | 0 | 0 | 0 | Pi | Pi | Pi | Pi | 0 | 0 | 0 | 0 | 0 | 0 | 1 | 1 | P | P | P | P | 1 | 1 | 0 | 0 |
| $C_{WH}$ | 1 | 1 | 0 | 0 | 0 | 0 | 0 | 0 | Pi | Pi | Pi | Pi | 0 | 0 | 0 | 0 | 0 | 0 | 1 | 1 | P | P | P | P |
| $C_{WL}$ | 0 | 0 | 0 | 0 | 0 | 0 | 1 | 1 | P | P | P | P | 1 | 1 | 0 | 0 | 0 | 0 | 0 | 0 | 0 | 0 | Pi | Pi | Pi | Pi |

TABLE 3

Soft-switching forward mode

| state | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| $C_{UH}$ | 1 | 1 | 1 | 1 | P | P | P | 0 | 0 | Pi | Pi | Pi | 0 | 0 | 0 | Pi | Pi | 0 | 0 | 0 | P | P | P |
| $C_{UL}$ | 0 | 0 | 0 | 0 | Pi | Pi | 0 | 0 | 0 | P | P | 1 | 1 | 1 | 1 | P | P | P | 0 | 0 | Pi | Pi | Pi |
| $C_{VH}$ | 0 | Pi | Pi | Pi | 0 | 0 | 0 | Pi | Pi | 0 | 0 | 0 | P | P | P | 1 | 1 | 1 | 1 | P | P | P | 0 |
| $C_{VL}$ | 0 | P | P | P | 1 | 1 | 1 | 1 | P | P | P | 0 | 0 | Pi | Pi | Pi | 0 | 0 | 0 | Pi | Pi | Pi | 0 | 0 |
| $C_{WH}$ | Pi | Pi | 0 | 0 | 0 | P | P | P | 1 | 1 | 1 | P | P | P | 0 | 0 | Pi | Pi | Pi | 0 | 0 | 0 | 0 |
| $C_{WL}$ | P | P | P | 0 | 0 | Pi | Pi | Pi | 0 | 0 | 0 | Pi | Pi | Pi | 0 | 0 | 0 | P | P | P | 1 | 1 | 1 | 1 |

TABLE 4

| | Soft-switching reverse mode | | | | | | | | | | | | | | | | | | | | | | | |
|---|---|---|---|---|---|---|---|---|---|---|---|---|---|---|---|---|---|---|---|---|---|---|---|---|
| state | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 |
| $C_{UH}$ | Pi | Pi | Pi | Pi | 0 | 0 | 0 | 0 | 0 | 1 | 1 | 1 | P | P | P | P | 1 | 1 | 1 | 0 | 0 | 0 | 0 | 0 |
| $C_{UL}$ | P | P | P | P | 1 | 1 | 1 | 0 | 0 | 0 | 0 | 0 | Pi | Pi | Pi | Pi | 0 | 0 | 0 | 0 | 0 | 1 | 1 | 1 |
| $C_{VH}$ | 0 | 1 | 1 | 1 | P | P | P | P | 1 | 1 | 1 | 0 | 0 | 0 | 0 | 0 | Pi | Pi | Pi | Pi | 0 | 0 | 0 | 0 |
| $C_{VL}$ | 0 | 0 | 0 | 0 | Pi | Pi | Pi | Pi | 0 | 0 | 0 | 0 | 0 | 1 | 1 | 1 | P | P | P | P | 1 | 1 | 1 | 0 |
| $C_{WH}$ | 1 | 1 | 1 | 0 | 0 | 0 | 0 | 0 | Pi | Pi | Pi | Pi | 0 | 0 | 0 | 0 | 0 | 1 | 1 | 1 | P | P | P | P |
| $C_{WL}$ | 0 | 0 | 0 | 0 | 0 | 1 | 1 | 1 | P | P | P | P | 1 | 1 | 1 | 0 | 0 | 0 | 0 | 0 | Pi | Pi | Pi | Pi |

The invention claimed is:

1. A driver for a brushless motor, comprising:
a static position sensing device;
a back EMF detector for detecting a back EMF signal; comprising:
a filter for filtering the back EMF signal;
an output stage comprising at least three modules for supplying a current to a respective phase coil of the motor;
a commutating device for selectively enabling respective modules of the output stage depending on the position of the motor, which selectively enabling is alternated with a commutation frequency, the commutating device being controlled by the static position sensing device at startup of the motor and by the back EMF detector after the first detected back EMF pulse;
a pulse width modulation unit controlling a strength of the current provided to the motor at a predetermined maximum value until the commutation frequency has a predetermined minimum value, and controlling the strength of the current at a value determined by an input signal when the commutation frequency has exceeded said minimum value, the filter having a relatively strong high frequency transfer characteristic at a relatively high commutation frequency and a relatively weak high frequency transfer characteristic at a relatively low commutation frequency.

2. A driver according to claim 1, characterized in that the back EMF detector has a threshold unit for suppressing the back EMF signal until a threshold value until the commutation frequency has the predetermined minimum value.

3. A driver according to claim 1, characterized by a hard switching operational mode wherein during each state of the commutation device one of the motor drive outputs provides a constant supply voltage, a second one of the outputs alternately provides a first and a second supply voltage and a third one is kept in a high impedance state.

4. Brushless motor driver according to claim 1, characterized in that the driver has a soft switching operational mode, which has at least a state during which two output modules simultaneously and in phase provide an output voltage alternating between the first and the second power supply voltage.

5. Brushless motor driver according to claim 4, characterized in that during at least a part of a state of the commutation device one of the motor drive outputs provides a constant supply voltage, a second one of the outputs alternately provides a first and a second supply voltage and a third one is alternately switched between the high impedance state and a state wherein the first power supply voltage is provided synchronously with the second output.

6. Brushless motor driver according to claim 5, the said part of the state of the commutation device is the end of said commutation state, and has a fixed duration.

7. Brushless motor driver according to claim 1, characterized in by a reverse soft switching mode where the commutation device has at least 1 state during which a first and a second output of the output stage both provide a first supply voltage, while a third output alternately provides the first supply voltage and a second supply voltage.

8. Brushless motor driver according to claim 3, wherein the driver assumes the soft switching mode when the relative change in time interval between two subsequent back EMF pulses is less then a predetermined value, and assumes hard switching mode when the relative change is greater than the predetermined value.

9. Brushless motor driver according to claim 1, wherein the state of the commutation device is controlled by the static positioning facility if the time interval between two subsequent back EMF pulses is greater than a predetermined time interval.

10. Brushless motor driver according to claim 1, wherein the driver has a first braking mode wherein the remanent kinetic energy of the motor is recuperated into electric energy for recharging the power supply.

11. Brushless motor driver according to claim 6, wherein the motor driver has a second braking mode wherein the motor brakes by resistive losses.

12. Data reading/writing device, comprising a holder for receiving a data carrier, a motor for moving the data carrier, a motor driver as claimed in claim 1 for driving the motor and a read/write unit for reading the data carrier.

* * * * *